(12) United States Patent
Nguyen et al.

(10) Patent No.: US 10,150,848 B2
(45) Date of Patent: Dec. 11, 2018

(54) POLYMER CELLULOSE NANOCRYSTAL COMPOSITE AEROGELS

(71) Applicants: CASE WESTERN RESERVE UNIVERSITY, Cleveland, OH (US); THE UNITED STATES OF AMERICA, AS REPRESENTED BY THE ADMINISTRATOR OF THE NATIONAL AERONAUTICS AND SPACE ADMINISTRATION, Washington, DC (US)

(72) Inventors: Baochau Nguyen, North Royalton, OH (US); Mary Ann Meador, Strongsville, OH (US); Stuart Rowan, Shaker Heights, OH (US); Elvis Cudjoe, Cleveland Heights, OH (US)

(73) Assignees: CASE WESTERN RESERVE UNIVERSITY, Cleveland, OH (US); THE UNITED STATES OF AMERICA, AS REPRESENTED BY THE ADMINISTRATOR OF NASA, Washington, DC (US)

( * ) Notice: Subject to any disclaimer, the term of this patent is extended or adjusted under 35 U.S.C. 154(b) by 368 days.

(21) Appl. No.: 14/815,153

(22) Filed: Jul. 31, 2015

(65) Prior Publication Data

US 2016/0032073 A1    Feb. 4, 2016

Related U.S. Application Data

(60) Provisional application No. 62/031,421, filed on Jul. 31, 2014.

(51) Int. Cl.
*C08J 9/35*    (2006.01)
*C08J 9/00*    (2006.01)
*C08J 9/28*    (2006.01)

(52) U.S. Cl.
CPC ............ *C08J 9/0061* (2013.01); *C08J 9/28* (2013.01); *C08J 2201/0502* (2013.01);
(Continued)

(58) Field of Classification Search
CPC ............ C08J 2205/026; C08G 75/02–75/0277
See application file for complete search history.

(56) References Cited

U.S. PATENT DOCUMENTS

2011/0319261 A1* 12/2011 Innerlohinger ........ A47C 27/14
                                                              502/402
2013/0171439 A1*  7/2013 Shoseyov .............. B82Y 30/00
                                                              428/220

OTHER PUBLICATIONS

"Technical Bulletin Jeffamine ED-600 Polyetheramine" by Huntsman. 2007, 2008.*

(Continued)

*Primary Examiner* — Michael M Dollinger
*Assistant Examiner* — Christina H Wales
(74) *Attorney, Agent, or Firm* — Hudak, Shunk & Farine Co. LPA

(57) ABSTRACT

Composite materials including cellulose nanocrystals incorporated into a polymer aerogel scaffold, wherein the cellulose nanocrystals serve as a reinforcement agent to result in the formation of less dense aerogels, improve the tensile mechanical properties of aerogel films, and reduce aerogel shrinkage upon thermal exposure. After gelation, the gel is dried via a suitable method such as supercritical $CO_2$ extraction, freeze drying or other method, to produce the CNC/polymer composite aerogel. Properties of the composite aerogel can be tailored via surface modification of the cellulose nanocrystals as well as through the backbone structure of the polymer.

13 Claims, 12 Drawing Sheets

(52) U.S. Cl.
CPC .. *C08J 2201/0543* (2013.01); *C08J 2205/026* (2013.01); *C08J 2379/08* (2013.01); *C08J 2381/00* (2013.01); *C08J 2401/00* (2013.01); *Y02P 20/544* (2015.11)

(56) References Cited

OTHER PUBLICATIONS

Guo, H.; Meador, M.; McCorkle, L.; Quade, D.; Guo, J.; Hamilton, B.; Cakmak, M. "Tailoring Properties of Cross-linked polyimide aerogels for better moisture resistance, flexibility and strength". ACS Applied Materials and Interfaces 2012, 4, 5422-5429.*

Kanoth, B.; Claudino, M.; Johansson, M.; Berglund, L.; Zhou, Q. "Biocomposites from Natural Rubber: Synergistic Effects of Functionalized Cellulose Nanocrystals as Both Reinforcing and Cross-Linking Agents via Free-Radical Thiol—ene Chemistry". ACS Appl. Mater. Interfaces 2015, 7, 16303-163110.*

Williams, J.; Meador, M.; McCorkle, L.; Mueller, C.; Wilmoth, N. "Synthesis and Properties of Step-Growth Polyamide Aerogels Crosslinked with Triacid Chlorides" Chem. Mater. 2014, 26, 4163-4171.*

Meador, M.; Aleman, C.; Hanson, K.; Ramirez, N.; Vivod, S.; Wilmoth, N.; McCorkle, L. "Polyimide Aerogels with Amide Cross-Links: A Low Cost Alternative for Mechanically Strong Polymer Aerogels" ACS Appl. Mater. Interfaces 2015, 7, 1240-1249.*

* cited by examiner

Figure 1: Monomers Used

Figure 3: Density and Shrinkage
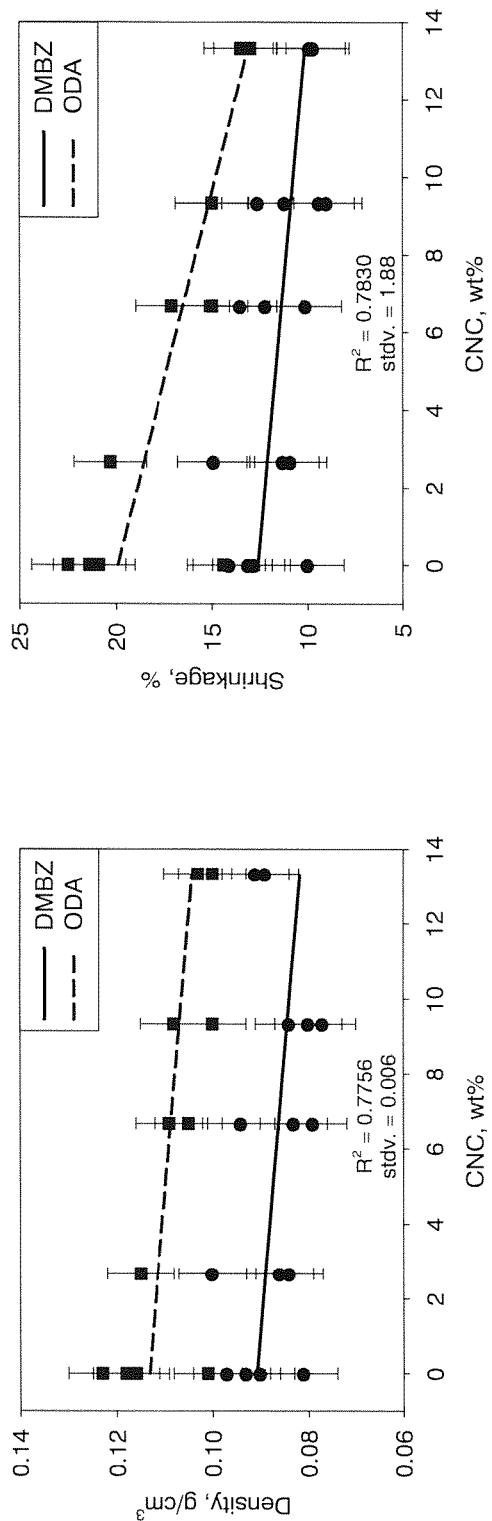
(3a)
(3b)

Figure 4: Compression properties
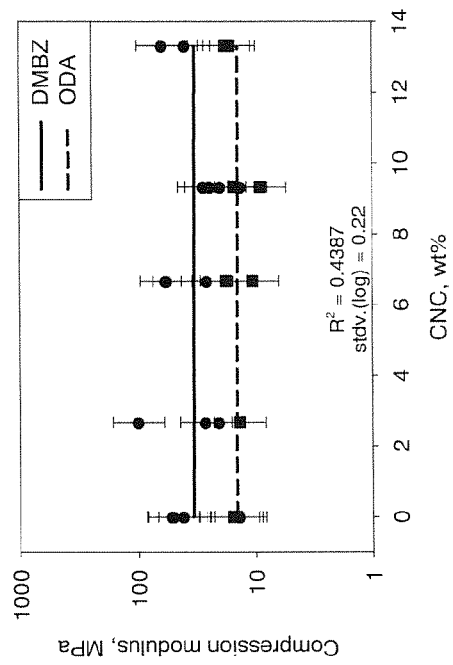
(4b)
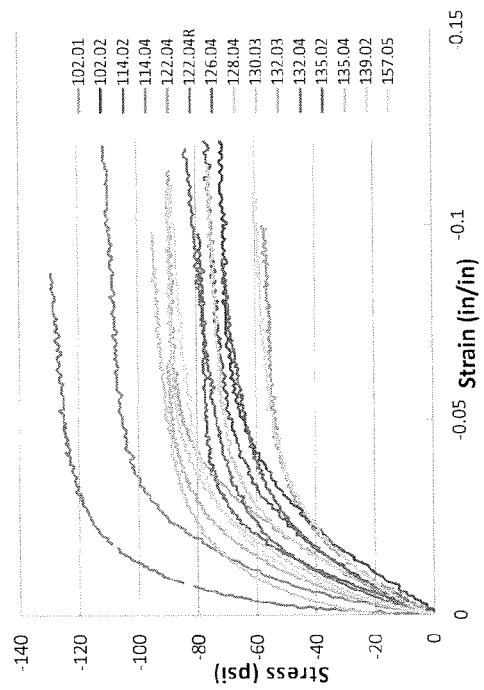
(4a)

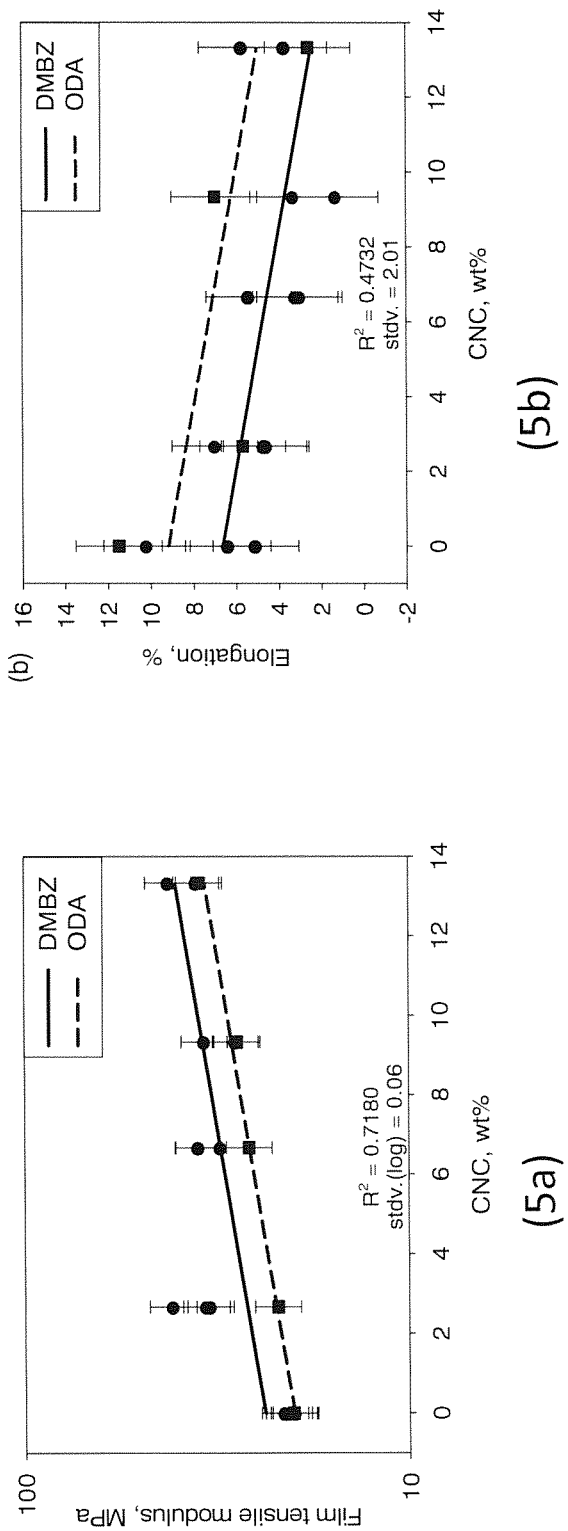
Figure 5: Tensile properties

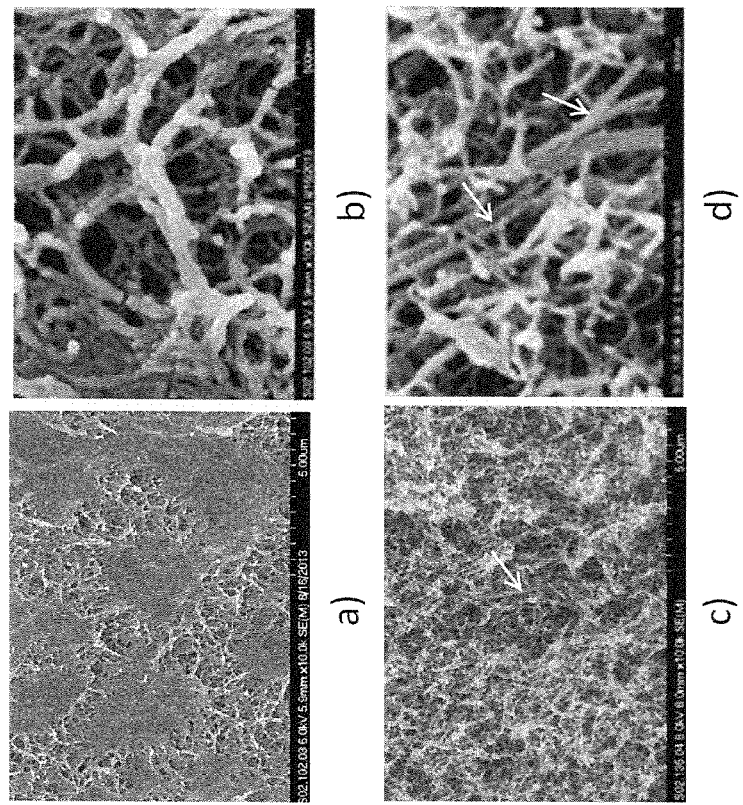
Figure 6: SEM images
a) higher magnification and b) lower magnification with no CNC,
c) higher magnification and d) lower magnification with 13.33%CNC

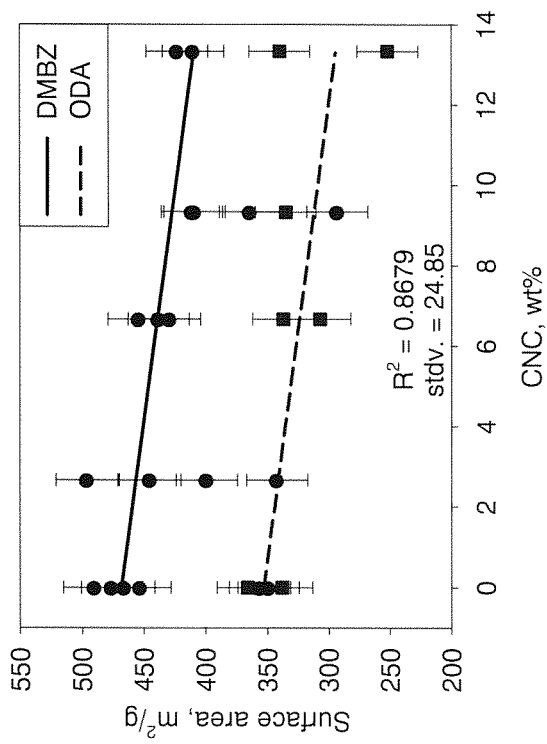
Figure 7: BET surface area

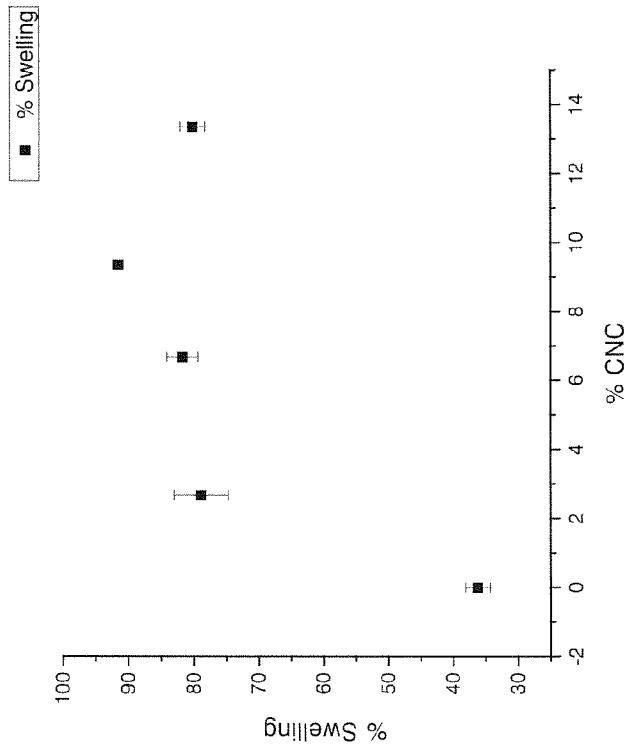
Figure 8: % Water swelling

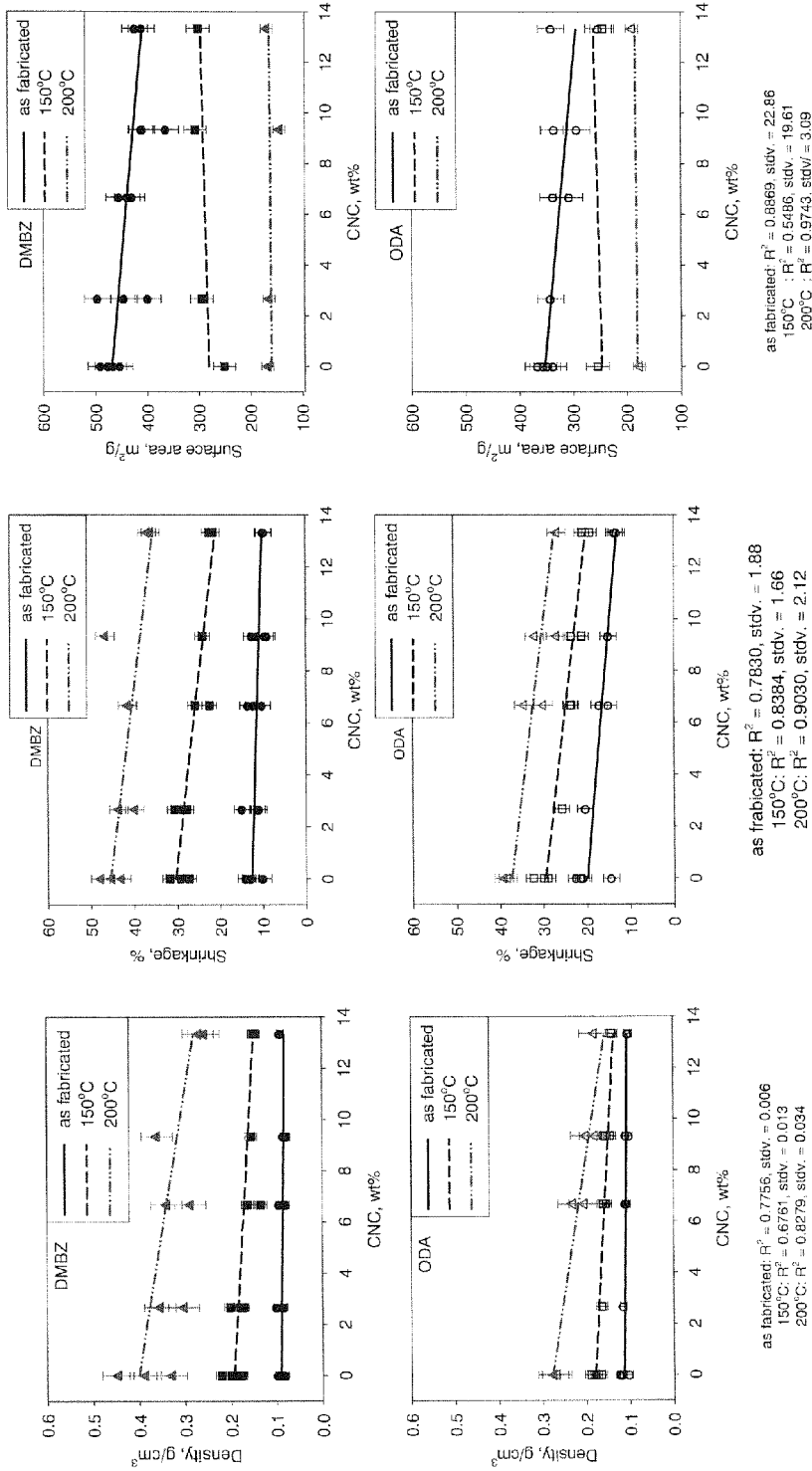
Figure 9: Thermally Treated Aerogels

Figure 11: Thermal shape memory of thiol-ene/CNC composite aerogels

Figure 12
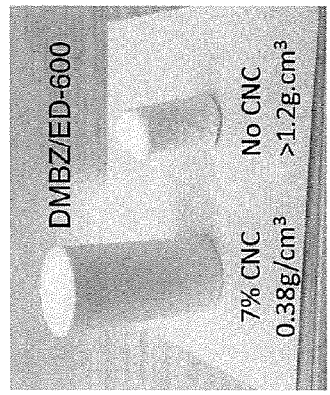
(b)
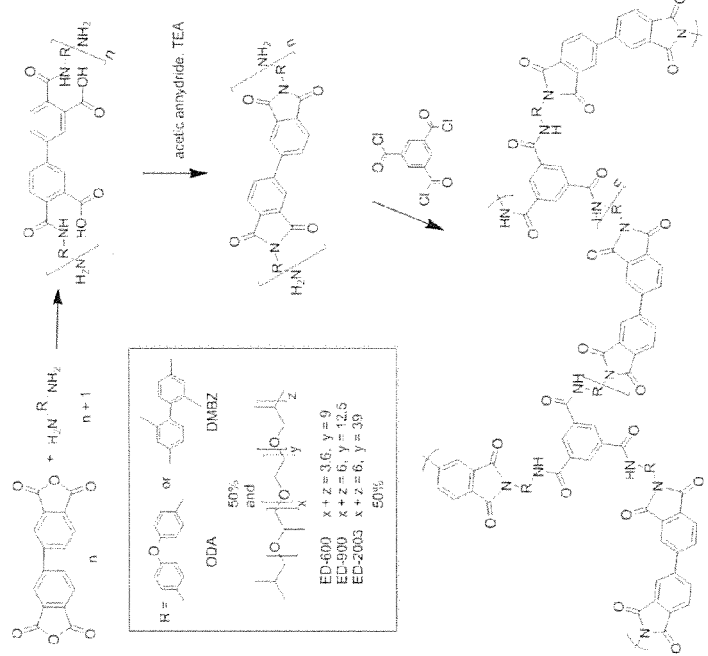
(a)

POLYMER CELLULOSE NANOCRYSTAL COMPOSITE AEROGELS

FIELD OF THE INVENTION

The present invention relates to composite materials including cellulose nanocrystals incorporated into a polymer aerogel scaffold, wherein the cellulose nanocrystals (CNCs) serve as a reinforcement agent to result in the formation of less dense aerogels, improve the tensile mechanical properties of aerogel films, and reduce aerogel shrinkage upon thermal exposure. The cellulose nanocrystals are incorporated into the polymer solution prior to gelation. After gelation, the gel is dried via a suitable method such as super critical $CO_2$ extraction, freeze drying or other methods, to produce the CNC/polymer composite aerogel. Properties of the composite aerogel can be tailored via surface modification of the cellulose nanocrystals as well as through the backbone structure of the polymer.

BACKGROUND OF THE INVENTION

Aerogels are low density solids typically made from gels which are dried in such a way as to preserve the gel structure. On account of the fact that they possess high porosity with very small, nanoscale pores, aerogels have many interesting properties, including low thermal conductivities, low dielectric constants, and high surface areas. These properties make aerogels highly desirable for many applications such as insulation for aerospace, construction, pipelines, refrigeration, electronics and clothing or as low dielectric substrates for lightweight antennas and other devices.

On account of their low density and open porosity, aerogels can also be fragile and environmentally sensitive, making their utilization difficult in certain applications. As such the mechanical properties of aerogels are density dependent, generally decreasing with decreasing density. This is in contrast to the desirable properties of aerogels (e.g. porosity, light weight etc.), which are improved with decreasing density. Thus, a way to improve the mechanical properties of aerogels especially at the low densities is highly desired.

Polymer aerogels, especially polyimide and polyamide aerogels, have improved mechanical properties over silica or silica-polymer hybrid aerogels. They also can be made in flexible thin films, increasing utility in many applications. However, the mechanical properties of these polymer aerogels still decrease with decreasing density. In recent years, cellulose nanocrystals (CNC) have been investigated as, potentially low cost, biorenewable reinforcement for polymers. They exist in most plants and can also be found in the mantles of sea tunicates and obtained from certain algae and bacteria. Their surface functionalities can be easily modified with different charge densities or surface functionality, making them compatible with many types of polymers. CNC/polymer nanocomposites also have been shown to respond to stimuli as a new class of smart materials.

As stated, mechanical properties of the polyimide polymer aerogels decrease as density is decreased. In addition, thin films from very low density formulations are especially weak and difficult or impossible to fabricate.

SUMMARY OF THE INVENTION

In view of the problems noted above and others, it is an object of the present invention to provide composite aerogels that solve the problems noted above and provide aerogels with improved mechanical properties by incorporating cellulose nanocrystals into the aerogel. The composites are formed by incorporating the cellulose nanocrystal in a solution with a gel precursor. After gelation, the resulting nanocomposite gel is dried via a suitable method to create a nanocomposite aerogel.

Still another object of the present invention is to provide composite aerogels that have stimuli-responsive properties such as shape-memory or mechanically dynamic behavior. Such properties allow application of the aerogels as multipurpose structures with low bearing capability, thermal management, thermal protection, micrometeoroid impact resistance and many other capabilities.

Yet another object of the present invention is to provide shape and/or modulus changing aerogels that could be used to enable morphing structures, deployable structures and extremely lightweight actuation systems with no moving parts and in various embodiments having densities between 0.1 to 0.2 $g/cm^3$.

A further object of the present invention is to provide composite aerogels formed by a method comprising the steps of combining an aerogel precursor solution with a cellulose nanocrystal and polymerizing to form a gel, followed by drying the gel by a suitable method such as supercritical $CO_2$ extraction, freeze drying or other methods to create the composite aerogel. The method in some embodiments further includes the step of fabricating a film or a structural part by casting the gel precursor solution into a thin film or placing the solution into a mold.

Another object of the present invention is to provide composite aerogels that include cellulose nanocrystals that are in one or more of a native form or include surface functionality to aid compatibilization with a particular polymer backbone or even react with the polymer.

Still another object is to provide a composite aerogel comprising cellulose nanocrystals incorporated into a cross-linked polymer. The incorporation of the nanocrystals in the polymer scaffold results in aerogels that maintain the porous structure and for example, exhibit low density, low shrinkage, and high porosity, while at the same time exhibit improved mechanical properties.

A further object of the present invention is to provide cross-linked polyimide aerogel composites made by dissolving a combination of dianhydrides, diamines and a cross-linker in solution in a balanced stoichiometry, along with a dispersion of the cellulose nanocrystals. Addition of an amine catalyst and a water scavenger such as an acetic anhydride promotes complete imidization and gelation at room temperature.

Still another object of the present invention is to provide a composite aerogel including a cellulose nanocrystal that exhibits reduced shrinkage of the aerogel at a higher temperature, such as from about 150° C. to about 200° C. as compared to a polymer aerogel without the nanocrystals.

BRIEF DESCRIPTION OF THE DRAWINGS

The invention will be better understood and other features and advantages will become apparent by reading the detailed description of the invention, taken together with the drawings, wherein:

FIG. 3 illustrates plots of (3a) density and (3b) shrinkage of polyimide aerogel/CNC nanocomposites graphed vs. increasing CNC concentration. Error bars are from multiple linear regression analysis of pooled data.

FIG. 4 illustrates plots of (4a) stress strain curves from compression and (4b) Young's Modulus graphed vs. increasing CNC concentration. Error bars are from multiple linear regression analysis of pooled data.

FIG. 5 illustrates plots of (5a) tensile modulus and (5b) tensile elongation at break of aerogels graphed vs. increasing CNC concentration. Error bars are from multiple linear regression analysis of pooled data.

FIG. 6 illustrates scanning electron micrographs of polyimide aerogels with no CNC at a) higher magnification and b) lower magnification) and with 13.33% CNC at c) higher magnification and d) lower magnification).

FIG. 7 illustrates a plot of BET surface area of the aerogels measured by nitrogen sorption graphed vs. increasing CNC concentration. Error bars are from multiple linear regression analysis of pooled data.

FIG. 8 illustrates a plot of percent water swelling vs. increasing CNC concentration. Error bars are from multiple linear regression analysis of pooled data.

FIG. 9 illustrates plots of (9a) density, (9b) shrinkage and (9c) surface area of thermally treated aerogel nanocomposites. Error bars are from multiple linear regression analysis of pooled data.

FIG. 12 illustrates (a) a reaction mechanism and (b) an image of monoliths described in the examples.

DETAILED DESCRIPTION OF THE INVENTION

Figure 1:
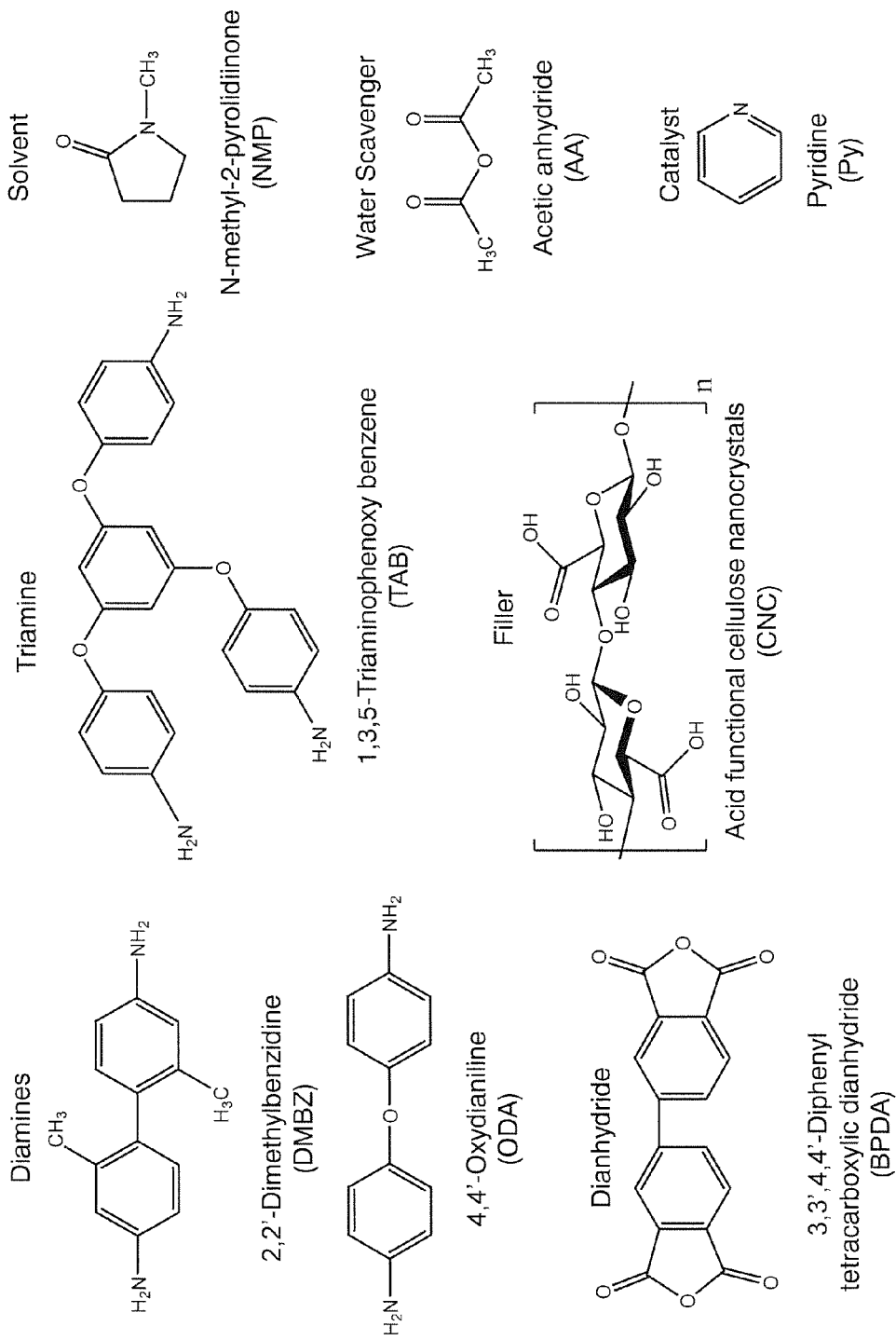
FIG. 1 illustrates one embodiment of a schematic showing monomers used in the fabrication of polyimide/CNC composite aerogels.

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

Polymeric cellulose nanocrystal composite aerogels are described herein. The cellulose nanocrystals are incorporated into the polymer aerogel scaffold as a reinforcement agent. Methods for preparing the composite aerogels are also disclosed.

Cellulose Nanocrystals (CNCs)

Numerous different types of cellulose nanocrystals can be utilized in the present invention. Cellulose nanocrystals have been isolated from various organic sources. Cellulose is found primarily in plants, such as cotton, grass or corn, but is also present in selected marine animals such as sea tunicates, as well as algae, bacteria and fungi. Cellulose nanocrystals isolated from wood are commercially available. Cellulose nanocrystals can be obtained from commercial microcrystalline cellulose (MCC). Cellulose nanocrystals isolated from tunicates have higher aspect ratios than those obtained from wood/MCC. The cellulose nanocrystals can also be isolated from many different plant sources e.g. Miscanthus Giganteus (MxG-CNCs) or from bacterial or algae sources. The diameters range from 2 to 30 nm and the lengths range from 100 nm to several micrometers.

Methods for producing cellulose nanocrystals from Miscanthus Giganteus are set forth in WO 2015095641, herein fully incorporated by reference.

In order to provide desired properties to the composite aerogels, the cellulose nanocrystals are utilized generally in an amount less than 50 weight percent and generally from about 0.1, 0.5 or 1.0 to about 20 weight percent, desirably from about 2 to about 10 weight percent and preferably from about 5 to about 10 weight percent based on the total weight of cellulose nanocrystals and polymer present in a composite aerogel composition. The exact weight percent ideally required depends on the aspect ratio of the CNCs employed, which can vary from ca. 10 to over 150 depending on the biosources.

The cellulose nanocrystals can be utilized in native form or can be functionalized with appropriate functional groups. In one embodiment carboxylic acid functionalized CNCs allow for better dispersion in the gelation solvent and open up the possibility of reacting with the polymer (depending on gelation chemistry employed). In one embodiment, incorporation of functionalized CNCs into a cross-linked polyimide aerogel network modified with low $T_g$ soft blocks can provide shape memory materials. Relatively low $T_g$ soft blocks can be introduced into the high $T_g$ polyimide aerogel backbone similar to rod-coil polyimide electrolytes previously reported, see Meador, M.A.B ET AL, Chem. Mater. 2003, 15, 3018-3025 herein incorporated by reference. Incorporating lower $T_g$ segments (i.e. $T_g$ below the operating temperature of the material) into the polyimide maximizes the degree of mechanical contrast that can be obtained upon exposure to the stimulus. This is because the most significant reinforcement of the nanofiller (and therefore increase in composite stiffness) occurs above the $T_g$ of the matrix.

Polymer

Polyimide aerogels have been fabricated from anhydride capped polyimide oligomers crosslinked with multifunctional amines, including octa(aminophenyl) polysilsesquioxane, OAPS (Guo et al, *ACS Applied Materials and Interfaces* 2011, 3, 546-552), and 1,3,5-tri(aminophenoxy) benzene TAB (Meador et al, *ACS Applied Materials and Interfaces* 2012, 4, 536-544) both herein incorporated by reference. A variety of backbone chemistries have been examined for the polyimide aerogels including various dianhydrides such as benzophenone-3,3',4,4'-tetracarboxylic dianhydride (BTDA), biphenyl-3,3',4,4'-tetracarboxylic dianhydride (BPDA), and 2,2-bis(3,4-dicarboxyphenyl)-hexafluoropropane (6FDA), and various diamines such as 4,4'-oxydianiline (ODA), 2,2'-dimethylbenzidine (DMBZ), para-phenylene diamine (PPDA), and bisaniline-p-zylidene (BAX). It is understood that other dianhydrides and diamines could also be used in the synthesis of the polyimides. Properties of the polyimide aerogels are somewhat dependent on the backbone chemistry. For example, polyimide aerogels with stiffer backbone such as those made from DMBZ and BPDA in combination with either crosslinker leads to higher modulus at lower density than those made with ODA and BPDA. On the other hand, more flexible films can be made with ODA derived aerogels, but they are highly moisture sensitive (Guo et al *ACS Applied Materials and Interfaces*, 2012, 4, 5422-5420. Formulations made with a combination of 50% ODA and 50% DMBZ lead to polyimide aerogel films that are both moisture resistant and highly flexible.

Different backbone chemistry also leads to different amounts of shrinkage of the polyimide aerogels during processing. PPDA derived aerogels shrink the most leading to higher densities, while use of DMBZ as diamine leads to the lowest shrinkage. Aerogels which are derived from 6FDA as dianhydride and DMBZ exhibit the least amount of shrinkage. As mentioned, many properties of the aerogels, such as modulus, strength, dielectric constant and thermal conductivity scale with density. Thus, polyimide aerogels with 6FDA in the backbone have dielectric constants as low as 1.08 though modulus is only about 5 MPa (Meador et al, *ACS Applied Materials and Interfaces* 2014, 6, 6062-6068) while those made using BPDA and DMBZ in the backbone had dielectric constants almost as low (1.16) with modulus of 20-44 MPa (Meador et al *ACS Applied Materials and Interfaces,* 2012, 4, 6346-6353).

Various polymers can be utilized in the present invention including, but not limited to polyimides. Recently, polyamide aerogels have been reported with even higher modulus at similar densities to polyimides (Williams et al, Chemistry of Materials, 2014, ASAP (DOI 10.1021/cm5012313). These are derived from amine endcapped polyamide oligomers with 1,3,5-benzene-tricarbonyl trichloride (BTC) as cross-linker. The oligomers used metaphenylene diamine (MPDA) in combination with different amount of isophthaloyl chloride (IPC) or terephthaloyl chloride (TPC). Once again, backbone chemistry has an effect on shrinkage of the aerogels during processing with those made from TPC and MPDA shrinking the most, while IPC and MPDA aerogels showed much less shrinkage.

In another embodiment, polymers obtained using thiol-ene chemistry are used. These are derived from oligothiol and oligoene monomers. Examples of oligothiol monomers include, but not limited to, 1,6-hexanedithiol and 2,2'-ethylenedioxy(diethanethiol). Examples of oligoene monomers include, but not limited to, 1,5-hexadiene and 1,7-octadiene.

Polymers with suitable thermal transitions, such as a melting transition or a glass transition, can be used to create thermal shape memory aerogels.

Crosslinker

Crosslinkers can be employed when necessary to enhance mechanical stability. Any suitable crosslinker can be utilized. For the polyimides generally any multifunctional amine with 3 amine groups or more can be utilized as a crosslinker for polyimide aerogels. In general, molecular weight between crosslinks varies from 10,000 to 60,000 g/mol for polyimide aerogels. Lower molecular weights gel too fast and higher molecular weights may not gel. Polyamide aerogels which utilize the triacid chloride (BTC) as crosslinker also range from 10,000 to 60,000 g/mol between crosslinks. In this case, amine end-capped polyimide oligomers ranging from 10,000 to 60,000 g/mol are utilized.

For thiol-ene networks, any oligothiol or oligoalkene with three thiol or alkene moieties or more can be used at appropriate ratios as the crosslinker. In one embodiment, a tetrathiol crosslinker is added at an appropriate ratio to a diene monomer and bisthiol monomer to produce a cross-linked network with approximately 500-2000 g/mol as the average molecular weight between crosslinking points. If the shape memory effect is controlled by a melting transition, then the amount of crosslinker must be low enough to allow the material to crystallize. If the shape memory effect is controlled by the glass transition, then a sufficiently large amount of crosslinker should be used to provide an appropriate $T_g$.

Solvents

The gel precursor including the monomers utilized to form the desired polymer or pre-polymer along with the CNCs are added to a suitable solvent. In one embodiment the CNCs are first added to the solvent and then mixed, such as by sonication, prior to adding any desired monomers or polymers in order to disperse the CNCs to a desired degree.

The nature of the solvent is dependent on the monomers. In one embodiment, the solvent utilized disperses the CNCs. Such solvents include but are not limited to N-methylpyrrolidone (NMP), water or N,N-dimethylformamide (DMF). In another embodiment, solvents known to not disperse CNCs may also be utilized by first dispersing the CNCs in one of the aforementioned solvents and then using an iterative process of centrifugation, removal of supernatant liquid, and addition of new solvent containing incrementally greater quantities of the desired solvent. This method can be used to create CNC dispersions in solvents such as, but not limited to, ethanol, acetone and tetrahydrofuran (THF).

Additional Components

Various additional components can be added to the gel precursor solution that can be incorporated into the completed composite aerogel if desired. For example, in one embodiment water scavengers can be utilized in the polyimide materials. Acetic anhydride is one non-limiting example of the water scavenger. In additional embodiments catalysts including but not limited to pyridine and triethylamine can be utilized. An amine catalyst can be utilized when forming polyimides. The addition of an amine catalyst and a water scavenger serves to promote complete imidization and gelation at room temperature. In another embodiment for the thiol-ene polymers, photo- or thermally-activated radical initiators are used to initiate the thiol-ene reaction. These initiators are typically (although not exclusively) added in a mole ratio of 15:1 diene: initiator.

Methods for Forming the Composite Aerogels

As indicated hereinabove, in one embodiment the CNCs are placed in solution, generally utilizing a solvent compatible with the monomers or polymers utilized to form the composite aerogel. The CNCs are mixed utilizing any suitable mixing method for a desired period of time in order to obtain a dispersion. Afterwards, the monomers or polymers are added to the dispersed CNCs in the solvent. Any desired additives or crosslinkers can also be added simultaneously, or subsequent to addition of the monomers or polymers to the CNC dispersion. When monomers are utilized and/or crosslinking is desired, polymerization and/or crosslinking is performed. A complete polymerization reaction can be done using components such as catalyst and scavenger to remove by-products. For instance, in preparing CNC reinforced polyimide aerogel composites, acetic anhydride and pyridine or triethylamine can be used as water scavenger and catalyst, respectively, for a complete imidization. Such reaction can be done at room temperature.

After gelation, the resulting nanocomposite gel is dried utilizing a method known in the art, such as supercritical $CO_2$ extraction, freeze drying or other to create the nanocomposite aerogel. Solutions before gelation can be molded into shapes for various applications or cast into thin films or other structures as desired.

EXAMPLES

Set 1

In one embodiment, the CNC polymer dispersion can be prepared using NMP as a solvent. The CNC-polymer solution is then poured into cylindrical molds or cast into thin films and cured. Subsequently, the resulting nanocomposites gels are solvent exchanged with acetone to remove NMP prior to being supercritically dried with liquid $CO_2$ to form aerogels.

Figure 2:
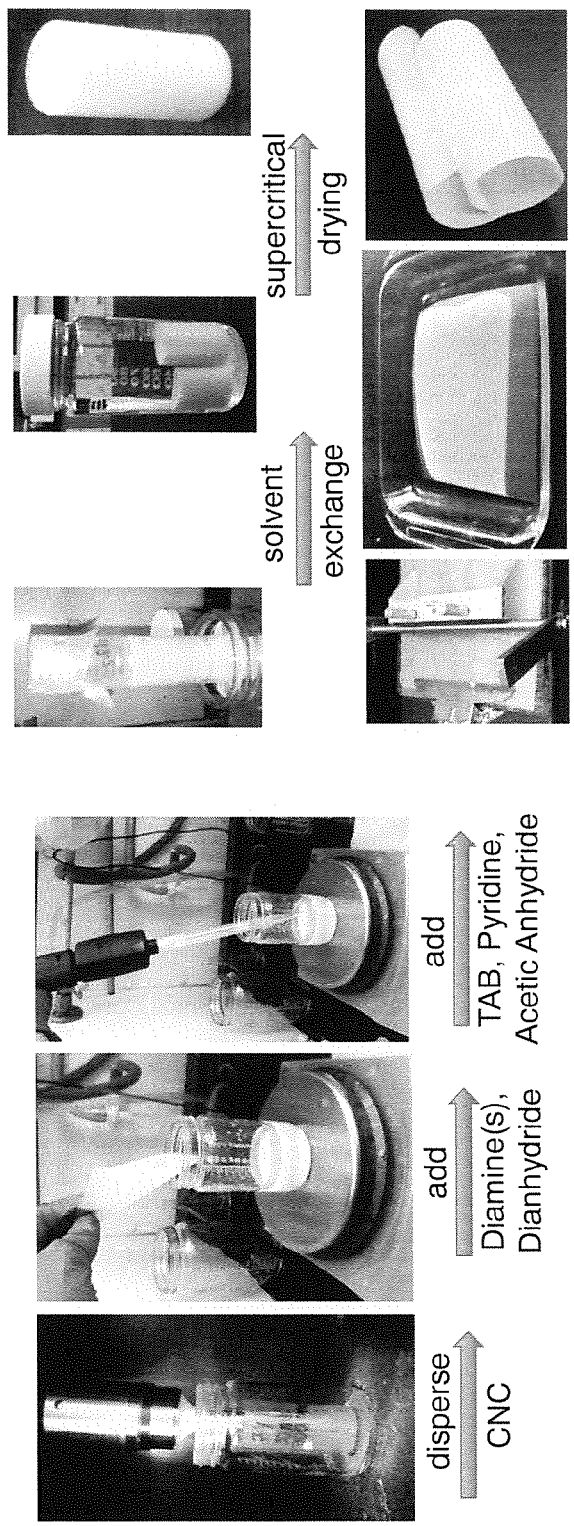
FIG. 2 illustrates a preparation procedure showing (left) solution preparation and (right) molding or film casting followed by supercritical drying to give the aerogels in both film and cylinder form.

Polyimide aerogels were fabricated as shown in FIG. 2 from a mixture of diamines, dianhydrides and a triamine crosslinker. In this example, the diamine used was either DMBZ, which makes the backbone stiffer, or ODA, which leads to a more flexible polymer backbone.

The properties of the aerogel nanocomposites with varying CNC concentrations and two different polyimide backbones were evaluated using Design Expert 8 statistical analysis software. The density of the aerogels as shown in FIG. 3a depended on both the diamine used and the amount of CNC incorporated. Lower density aerogels were obtained with DMBZ as the diamine as previously reported, while density decreased slightly with increasing CNC concentration. This is due to the decrease in shrinkage during processing (FIG. 3b) with increasing CNC concentration.

Compression tests were carried out on the aerogel cylinders with stress measured from dots painted on the aerogel samples and analyzed using ARAMIS software. Typical stress strain curves are shown in FIG. 4a. Young's modulus, taken as the initial slope of the stress strain curve, is graphed in FIG. 4b for each of the aerogel formulations. It is clear from this figure that the diamine has a significant effect on modulus. CNC concentration did not significantly affect compression modulus over and above standard error at this level of CNC loading.

Tensile tests were carried out on the thin film aerogel composites at CWRU using Dynamic Mechanical Analysis (DMA). As shown in FIG. 5a, CNC concentration did have an effect on tensile modulus which increased with increasing CNC concentration. Increasing CNC concentration also had an effect on the elongation at break (FIG. 5b), indicating that CNC increases the tensile stiffness of the films.

Examination of the morphology of the aerogels by scanning electron microscopy (SEM) in FIG. 6 shows that the arrangement of pores is also affected by the incorporation of CNC. Low magnification SEM shows that the aerogels with no CNC (a) has areas of less and more porosity distributed throughout, while the porosity is more evenly distributed in the sample containing CNC (c). At higher magnification (b no CNC and d 13.33% CNC), the appearance is more similar. Arrows in c and d are pointing to CNC fibers which are evident in the aerogel matrix. Some fibers may be incorporated into the polymer strands, making them difficult to pick out.

Nitrogen sorption was also performed on the aerogels and analyzed using the Brannauer Emmett Teller (BET) method in order to measure surface area of the aerogels. Incorporation of CNC also had a small but significant effect on surface area, especially for the aerogels made using DMBZ, as shown in FIG. 7. Increasing CNC caused about a 50 $m^2/g$ decrease in surface area over the whole range. It should be noted that this type of analysis does not measure the surface area in pores larger than about 100 nm, so the drop in surface area indicates that more porosity in the CNC aerogel composites falls above that range. This is in agreement with the appearance of the SEM at lower magnification The Rowan group had previously shown that homogenous incorporation of CNCs above the percolation threshold into a wide range of matrixes allows access to mechanically dynamic nanocomposites upon exposure to water. The premise here is that the mechanical properties of the materials are altered by controlling the interactions between the rigid filler component. As the CNCs have hydroxyl groups on their surface the high modulus films can be softened by any compound that disrupts the hydrogen bonding and as such exposure to water results in a dramatic reduction in modulus. Thus the prepared aerogels were studied to understand the effect that water has on them.

Water swelling data collected shows that the incorporation of CNCs enhances the water uptake of these aerogels (by as much as 3 times), see FIG. 8. Interestingly, however, no significant modulus change was observed. As an example, the dry modulus of an aerogel nanocomposite incorporated with 2.66% CNCs showed a modulus of 30.28±5.23 MPa whereas, the water swollen nanocomposite showed a modulus of 28.80±6.49 MPa. It is hypothesized that this is on account of the stiff (below $T_g$) and hydrophobic nature of the polyimide matrix which prevents disengagement of the CNC filler by water. If responsive aerogels are desired, then polyimides with lower $T_g$ would be required.

One unique property of polyimide aerogels is their ability to withstand high temperature applications. Thus aerogels prepared were thermally aged at 150° C. and 200° C. to understand the effect temperature has on them. Thermal analysis data shows an increase in density due to the shrinkage of the aerogels that occurs after exposure to 150° C. and 200° C. (FIG. 9). As an example, aerogels with ODA backbone with no filler has a density increase from 0.12 $g/cm^3$ to about 0.4 $g/cm^3$ after heating at 200° C., however with an incorporation of 13.33% CNCs shows an increase in density to 0.18 $g/cm^3$. It is therefore hypothesized that CNCs has a reinforcement effect on the aerogel structure.

Set 2

Figure 10:
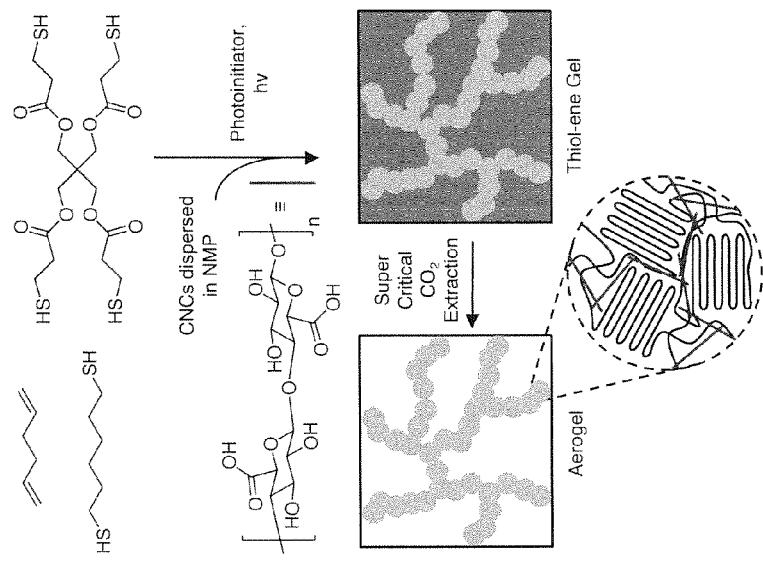
FIG. 10 illustrates one embodiment of a schematic showing monomers used in the fabrication of thiol-ene/CNC composite aerogels.

Thiol-ene aerogels were fabricated as shown in FIG. 10 from a mixture of oligoenes and oligothiols. In this case the oligothiols used were 1,6-hexanedithiol and pentaerythritol tetrakis(3-mercaptopropionate) and the oligoene used was 1,5-hexadiene. These monomers produce a semicrystalline crosslinked network.

The porosity of the gels was found to be 37% for a thiol-ene gel with no CNCs and 56% for the same composition gel but with 6 wt. % CNCs.

Figure 11:
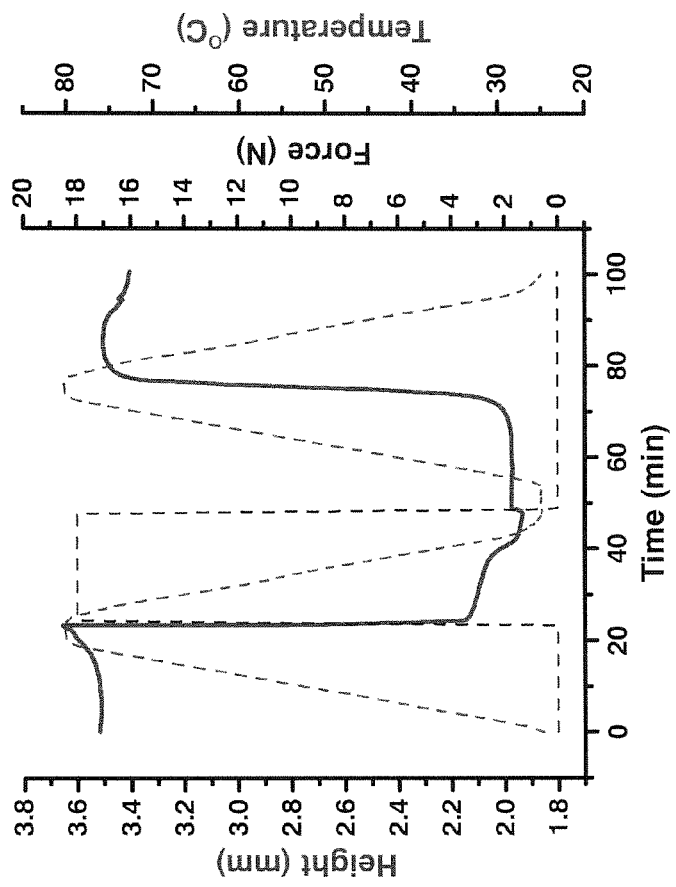
FIG. 11 illustrates a plot of the thermal shape memory of the thiol-ene/CNC composite aerogel with 6 wt. % CNCs.

The shape memory properties of the thiol-ene/CNC composite aerogels were evaluated using DMA (FIG. 11). The samples were heated above the melting point of the crystalline regions and then compressed. The samples were allowed to cool to room temperature under a compressive load. The load was then removed and height of the sample was measured. The sample was then reheated above the melting temperature under no load and then cooled once more to room temperature. The recovered sample height was then measured. Samples showed over 90% fixing of the temporary shape and over 90% shape recovery.

Set 3

Experimental

Materials. 2,2'-Dimethylbenzidine (DMBZ), 4,4'-oxydianiline (ODA), and biphenyl-3,3',4,4'-tetracarboxylic dianhydride (BPDA) were obtained from Wakayama Seika Kogya Com., Ltd., 1, 3,5-Tris(4-aminophenoxy)benzene (TAB) was custom synthesized by Oakwood Chemical. Acetone, N-methyl pyrrolidinone (NMP), Pyridine, acetic anhydride, triethylamine (TEA), 1,3,5-benzenetricarbonyl chloride (BTC), and 2,2,6,6-tetramethyl-1-piperidinyloxy (TEMPO) were purchased from Sigma Aldrich. Sodium Hypochlorite (NaClO, 14.5% chlorine content) was purchased from Alfa Aesar. Polyoxyalkyleneamines (PEO) or Jeffamine ED600 (a polyetheramine, which is an aliphatic polyether diamine derived from a propylene oxide-capped polyethylene glycol. It is a water soluble liquid, with an approximate molecular weight of 600), ED900, and ED2003, were acquired by Huntsman Petrochemical Corp. Hydrochloric acid (HCI), sodium bromide (Naar) and sodium chloride (NaCl) were purchased from Fisher Scientific. Sea tunicates (Styela Clava) were collected from floating docks in Warwick Cove Marina (Warwick, RI) and were cleaned to obtain mantles as described previously in the art. Two different batches of t-CNCs were examined with surface carboxylic acid densities [COON] of 560 and 920mmol/kg. BPDA was dried at 125° C. in vacuum for 18 hours before use. Low AR CNC, or microcrystalline cellulose (MCC) having 360 mmol/kg was obtained from wood (Capadona, J.R.; Shanmuganathan, K.; Trittschuh, S.; Seidel, S.; Rowan, S.J.; Weder, C. Polymer Nanocomposites with Nanowhiskers Isolated from Microcrystalline Cellulose. *Biomacromolecules* 2009, 10, 712-716.) All other reagents were used without further purification.

Synthesis of polyimide composite aerogels. Formulated molecular weight (FMW) of polyimide chains between crosslinks was calculated with repeating unit, n, of 30 (Eq. 1). The total aerogel composite weight was kept constant at 7.5 wt % total solid, with 0 to 13.33 wt % of t-CNC—COOH incorporated (Eq. 2).

$$n(\text{DMBZ or ODA})+(n+1)(\text{BPDA})+(\tfrac{2}{3})(\text{TAB})-2(n+1)(\text{H}_2\text{O})=\text{FMW of PI} \quad (1)$$

$$\text{PI wt \%+CNC wt \%}=7.5 \text{ wt \% total concentration in solution} \quad (2)$$

In a typical reaction, a dispersion of 0.075 g (2.667 wt %) t-CNC—COOH in 30 ml NMP was sonicated for an hour. DMBZ (1.191 g, 5.610 mmol) was then added, followed by BPDA (1.706 g, 5.798 mmol), and the mixture was stirred until all BPDA dissolved. TAB (0.050 g, 0.125 mmol) in 3.75 ml NMP was then added with stirring. Once the solution became homogeneous, acetic anhydride (4.40 ml, 46.378 mmol, 8:1 molar ratio to BPDA) and pyridine (3.75 ml, 46.378 mmol, 8:1 molar ratio to BPDA) were added. The poly(amic acid) solution was then poured into cylindrical molds and/or cast into thin films before gelation. In film casting, the poly(amic acid) solution was poured onto a polyethylene sheet placed under a ChemInstrument EZ Coater EC-100. The gap on the doctor blade was set at 0.508 mm. The film was cast at a fixed speed of 47 ipm (119 cpm). Similar procedure was applied for neat polyimide aerogels. All the resulting gels were imidized and aged at room temperature for a day before the cylinders were demolded and films were peeled off the substrate. NMP in the wet gels was gradually washed out and replaced with acetone using the following routine: 75/25 vol % NMP/acetone, 25/75 vol % NMP/acetone, followed by an additional 5 washes with 100 vol % acetone. The solvent exchange was performed twice a day in 7-18 hour intervals. The washed gels, in acetone, were then dried by exchanging the acetone in the gels with liquid carbon dioxide (CO$_2$) using an Accudyne multivessel automated system. After supercritically dried, the specimens were outgassed in a vacuum oven at 85° C. for 12 hours to remove any solvent residue, resulting in cross-linked polyimide aerogel composites having a density of 0.115 g/cm$^3$. $^{13}$C solid NMR (ppm) for polyimide: 20 (—CH$_3$), 115-150 (aromatic), and 165 (imide); for t-CNC—COOH: 35, 70-75, 83-85, and 105-110.

The DMBZ-based polyimide composite aerogels having low AR CNC, with charge density of 360 mmol/kg, were also prepared with similar formulation and procedure, as described above.

Synthesis of polyimide-PEO aerogels, cross-linked with BTC. The BTC cross-linked polyimide-PEO aerogels were fabricated with 50 mol % DMBZ and 50 mol % ED600 and BPDA. Molecular weight (FMW) of polyimide chains between crosslinks was calculated with repeating unit, n, varied from 10 to 40 (Eq. 3). The total aerogel composite weight ranged from 7 to 10 wt % total solid, with 0 to 7 wt % of low AR CNC—COOH incorporated (Eq. 4).

$$(n+1)/2(\text{DMBZ})+(n+1)/2\text{PEO}+(n)(\text{BPDA})+(\tfrac{2}{3})(\text{BTC})-2n(\text{H}_2\text{O})=\text{FMW of PI-PEO} \quad (3)$$

$$\text{PI-PEO wt \%+CNC wt \%}=10 \text{ wt \% total concentration in solution} \quad (4)$$

An example synthesis of a 10 wt % polyimide-PEO aerogel and n of 40 was prepared as followed: to a solution of ED600 (2.27 g, 3.52 mmol) in 38.8 mL of NMP was added BPDA (2.17 g, 7.39 mmol). After a homogeneous solution was achieved, DMBZ (0.80 g, 3.52 mmol) was added and dissolved thoroughly. Acetic anhydride (5.58 mL, 59.0 mmol, 8:1 molar ratio to BPDA) was added and stirred until homogeneously mixed. Then TEA (1.03 mL, 7.39 mmol, 1:1 molar ratio to BPDA) was added and the solution was stirred continuously. After ten minutes, a solution of BTC (0.033 g, 0.124 mmol) in 5 mL NMP was added to the stirring solution. The solution was poured into syringe molds immediately after the BTC was thoroughly dispersed. The gel network formed within 25 minutes of addition of the cross-linker. The gels were aged for a day at room temperature before the solvent exchange, followed by supercritical drying via CO$_2$ extraction method. The resulting monolith shrank during the supercritical drying process, resulting in a density greater than 12 g/cm$^3$ and no porosity, see FIG. 12.

A 10 wt % total solid of BTC cross-linked polyimide-PEO composite aerogels, having 7 wt % low AR CNC, with charge density of 360 mmol/kg, was prepared as followed: To a solution of CNC (0.350 g), dispersed in 38.8 ml of NMP, as added ED600 (2.1120 g, 3.52 mmol), followed by BPDA (0.75 g, 6.87 mmol). After a homogeneous solution was achieved, DMBZ (0.75 g, 3.52 mmol) was added and dissolved thoroughly. Acetic anhydride (5.20 mL, 55.01 mmol, 8:1 molar ratio to BPDA) was added and stirred until homogeneously mixed. Then TEA (0.96 mL, 6.89 mmol, 1:1 molar ratio to BPDA) was added and the solution was stirred continuously. After ten minutes, a solution of BTC (0.030 g, 0.113 mmol) in 5 mL NMP was added to the stirring solution. The solution was poured into syringe molds immediately after the BTC was thoroughly dispersed. The gel network formed within 25 minutes of addition of the cross-linker. The gels were aged for a day at room temperature before the solvent exchange, followed by supercritical drying via CO$_2$ extraction method. Density of the resulting aerogel was 0.38 g/cm3, with porosity of 70%. Compared to the density of the monolith with no CNC, shrinkage was reduced by more than half, see FIG. 12.

While in accordance with the patent statutes the best mode and preferred embodiment have been set forth, the scope of the invention is not limited thereto, but rather by the scope of the attached claims.

What is claimed is:
1. A composite aerogel composition, comprising: an aerogel scaffold comprising both a polymer and cellulose nanocrystals, wherein the cellulose nanocrystals are present in an amount less than 50 weight percent based on the total weight of the cellulose nanocrystals and polymer in the composition, wherein the cellulose nanocrystals are present in an amount from about 0.1 to about 20 weight percent based on the total weight of the cellulose nanocrystals and polymer in the composition, wherein the polymer comprises a thiol-ene-based polymer and wherein the polymer is derived at least from an oligoene and oligothiol.

2. The composition according to claim 1, wherein the cellulose nanocrystals are present in an amount from about 2 to about 10 weight percent based on the total weight of the cellulose nanocrystals and polymer in the composition.

3. The composition according to claim 1, wherein the composition further includes a crosslinker.

4. The composition according to claim 3, wherein the crosslinker comprises a multifunctional amine having three or more amine groups or a multifunctional thiol having three or more thiol groups.

5. The composition according to claim 4, wherein the number average molecular weight between crosslinks of the polymer varies from 10,000 to 60,000 g/mol.

6. The composition according to claim 5, wherein the composition further includes one or more of a water scavenger and a catalyst.

7. The composition according to claim 1, wherein the oligoene comprises 1,5-hexadiene and wherein the oligothiol comprises 1,6-hexanedithiol and pentaerythritol tetrakis(3-mercaptopropionate).

8. A composite aerogel composition, comprising: an aerogel scaffold comprising both a polymer and cellulose nanocrystals, wherein the cellulose nanocrystals are present in an amount less than 50 weight percent based on the total weight of the cellulose nanocrystals and polymer in the composition, wherein the cellulose nanocrystals are present in an amount from about 0.1 to about 20 weight percent based on the total weight of the cellulose nanocrystals and polymer in the composition, wherein the polymer comprises a polyimide polymer, wherein the polymer is derived at least from DMBZ and BPDA, and wherein the polymer is further derived from an aliphatic polyether diamine derived from a propylene oxide-capped polyethylene glycol.

9. A composite aerogel composition, comprising: an aerogel scaffold comprising both a polymer and cellulose nanocrystals, wherein the cellulose nanocrystals are present in an amount less than 50 weight percent based on the total weight of the cellulose nanocrystals and polymer in the composition, wherein the cellulose nanocrystals are present in an amount from about 0.1 to about 20 weight percent based on the total weight of the cellulose nanocrystals and polymer in the composition, wherein the polymer comprises a polyimide polymer, wherein the polymer is derived at least from DMBZ and BPDA, and wherein BTC is present in the polymer as a crosslinker.

10. A method for forming a composite aerogel composition, comprising the steps of:
 obtaining a solution comprising cellulose nanocrystals and monomers;
 polymerizing the monomers in the presence of the cellulose nanocrystals to form a gel; and
 drying the gel to form the composite aerogel according to claim 1.

11. The method according to claim 10, further including the step of crosslinking the polymer.

12. The method according to claim 11, wherein the cellulose nanocrystals are present in an amount from about 0.1 to about 20 weight percent based on the total weight of the cellulose nanocrystals and polymer in the composition- and wherein the polymer comprises a thiol-ene-based polymer.

13. The method according to claim 12, wherein a number average molecular weight between crosslinks of the polymer varies from 10,000 to 60,000 g/mol.

* * * * *

UNITED STATES PATENT AND TRADEMARK OFFICE
CERTIFICATE OF CORRECTION

PATENT NO. : 10,150,848 B2
APPLICATION NO. : 14/815153
DATED : December 11, 2018
INVENTOR(S) : Baochau Nguyen et al.

It is certified that error appears in the above-identified patent and that said Letters Patent is hereby corrected as shown below:

In the Specification

In Column 1, after the title please list the following:
-- GOVERNMENT LICENSE RIGHTS
This invention was made with Government support under contract NNX11AN50H awarded by NASA. The Government has certain rights in the invention. --

Signed and Sealed this
Fifth Day of March, 2019

Andrei Iancu
*Director of the United States Patent and Trademark Office*